United States Patent
Lin

(10) Patent No.: US 12,432,746 B2
(45) Date of Patent: Sep. 30, 2025

(54) APPARATUS AND METHOD OF COMMUNICATION OF SAME

(71) Applicant: GUANGDONG OPPO MOBILE TELECOMMUNICATIONS CORP., LTD., Guangdong (CN)

(72) Inventor: Hao Lin, Neuilly-sur-seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 420 days.

(21) Appl. No.: 17/971,427

(22) Filed: Oct. 21, 2022

(65) Prior Publication Data
US 2023/0047156 A1   Feb. 16, 2023

Related U.S. Application Data

(63) Continuation of application No. PCT/CN2021/082496, filed on Mar. 23, 2021.

(30) Foreign Application Priority Data

Apr. 22, 2020   (EP) ..................................... 20315206

(51) Int. Cl.
*H04W 72/23*   (2023.01)
(52) U.S. Cl.
CPC .................................. *H04W 72/23* (2023.01)
(58) Field of Classification Search
CPC ................................................... H04W 72/23
See application file for complete search history.

(56) References Cited

U.S. PATENT DOCUMENTS

| | | | |
|---|---|---|---|
| 2019/0313383 A1 | 10/2019 | Xiong et al. | |
| 2020/0314898 A1* | 10/2020 | Sun | H04L 1/1854 |
| 2022/0159630 A1* | 5/2022 | Nam | H04W 72/23 |
| 2023/0156572 A1* | 5/2023 | Reial | H04W 52/0229 |

FOREIGN PATENT DOCUMENTS

CN   110324127 A   10/2019

OTHER PUBLICATIONS

International Search Report (ISR) dated Jun. 22, 2021 for Application No. PCT/CN2021/082496.
Written Opinion (WOSA) dated Jun. 22, 2021 for Application No. PCT/CN2021/082496.
Motorola Mobitity et al."Feature Lead Summary: Email discussion[100e-NR-unlic-NRUDL_DL_Signals_and_Channels-03] on search space set monitoring/switching," R1-2001342, 3GPP TSG RAN WG1#100e, Feb. 24-Mar. 6, 2020, all pages.
Oppo, "Discussion on the remaining issues of DL signals and channels," R1-2001757, 3GPP TSG WG1 #100bis-E, Apr. 20-May 1, 2020, all pages.
Samsung, "DL signals and channels for NR-U," R1-2002115, 3GPP TSG RAN WG1 #100bis-e, e-Meeting, Apr. 20-30, 2020, all pages.

* cited by examiner

Primary Examiner — Ronald B Abelson
(74) Attorney, Agent, or Firm — Ladas & Parry, LLP

(57) ABSTRACT

An apparatus and a method of communication of the same are provided. A method of communication of a user equipment (UE) includes receiving, by the UE, a first information, and the first information corresponds to search space group monitoring for a first serving cell. This provides a search space group indication and further provides a method of search space group switching.

6 Claims, 1 Drawing Sheet

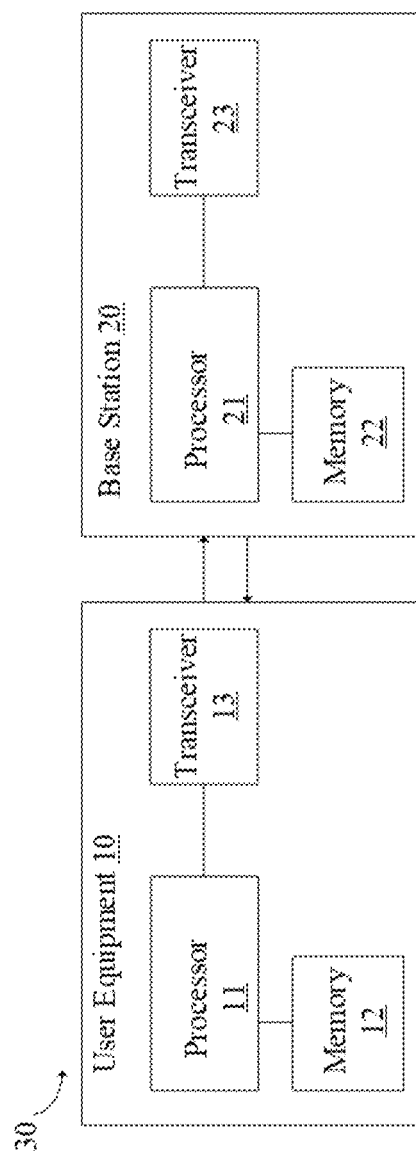

APPARATUS AND METHOD OF COMMUNICATION OF SAME

CROSS-REFERENCE TO RELATED APPLICATIONS

This application is a continuation of International Application No. PCT/CN2021/082496, filed on Mar. 23, 2021, which claims priority to European Patent Application No. 20315206.1, filed on Apr. 22, 2020. The disclosures of the aforementioned applications are hereby incorporated by reference in their entireties.

TECHNICAL FIELD

The present disclosure relates to the field of communication systems, and more particularly, to an apparatus and a method of communication of the same, which can provide a good communication performance and high reliability.

BACKGROUND

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

In Release 16, the UE can have different search space groups for physical downlink control channel (PDCCH) monitoring. However, how to provide a search space group indication to indicate the UE which search space group should be monitored and how to provide a method of search space group switching are still open issues.

Therefore, there is a need for an apparatus and a method of communication of the same, which can solve issues in the prior art, provide a search space group indication, and further provide a method of search space group switching.

SUMMARY

An object of the present disclosure is to propose an apparatus such as a user equipment (UE) and/or a base station (BS) and a method of communication of the same, which can solve issues in the prior art, provide a search space group indication, and further provide a method of search space group switching.

In a first aspect of the present disclosure, a method of communication of a user equipment (UE) includes receiving, by the UE, a first information, wherein the first information corresponds to search space group monitoring for a first serving cell.

In a second aspect of the present disclosure, a UE includes a memory, a transceiver, and a processor coupled to the memory and the transceiver. The processor is configured to control the transceiver to receive a first information, wherein the first information corresponds to search space group monitoring for a first serving cell.

In a third aspect of the present disclosure, a method of communication of a UE includes at least one of the followings: a) if the UE is not monitoring a PDCCH according to search space sets with search space group 1, the UE starts monitoring the PDCCH according to search space set with search space group 1, and the UE stops monitoring the PDCCH according to search space set with search space group 0, on a first serving cell at a first slot that is at least P symbols after the last symbol of the PDCCH with a DCI format 2_0, if the UE detects the DCI format 2_0 in a slot and a value of a first indication field in the DCI format 2_0 is 1; b) if the UE is not monitoring the PDCCH according to search space sets with search space group 0, the UE starts monitoring the PDCCH according to search space set with search space group 0, and the UE stops monitoring the PDCCH according to search space set with search space group 1, on the first serving cell at the first slot that is at least P symbols after the last symbol of the PDCCH with the DCI format 2_0, if the UE detects the DCI format 2_0 in a slot and the value of the first indication field in the DCI format 2_0 is 0; or c) if the UE monitors the PDCCH on the first serving cell according to search space sets with group index 1, the UE starts monitoring the PDCCH on a serving cell according to search space sets with group index 0, and the UE stops monitoring the PDCCH according to search space sets with group index 1, on the serving cell at the beginning of the first slot that is at least P symbols after the last symbol of the first slot where a timer expires or after a last symbol of a remaining channel occupancy duration for the first serving cell that is indicated by the DCI format 2_0.

In a fourth aspect of the present disclosure, a UE includes a memory, a transceiver, and a processor coupled to the memory and the transceiver. The processor is configured to perform at least one of the followings: a) if the UE is not monitoring a PDCCH according to search space sets with search space group 1, the UE starts monitoring the PDCCH according to search space set with search space group 1, and the UE stops monitoring the PDCCH according to search space set with search space group 0, on a first serving cell at a first slot that is at least P symbols after the last symbol of the PDCCH with a DCI format 2_0, if the UE detects the DCI format 2_0 in a slot and a value of a first indication field in the DCI format 2_0 is 1; b) if the UE is not monitoring the PDCCH according to search space sets with search space group 0, the UE starts monitoring the PDCCH according to search space set with search space group 0, and the UE stops monitoring the PDCCH according to search space set with search space group 1, on the first serving cell at the first slot that is at least P symbols after the last symbol of the PDCCH with the DCI format 2_0, if the UE detects the DCI format 2_0 in a slot and the value of the first indication field in the DCI format 2_0 is 0; or c) if the UE monitors the PDCCH on the first serving cell according to search space sets with group index 1, the UE starts monitoring the PDCCH on a serving cell according to search space sets with group index 0, and the UE stops monitoring the PDCCH according to search space sets with group index 1, on the serving cell at the beginning of the first slot that is at least P symbols after the last symbol of the first slot where a timer expires or after a last symbol of a remaining channel occupancy duration for the first serving cell that is indicated by the DCI format 2_0.

In a fifth aspect of the present disclosure, a method of communication of a UE includes at least one of the followings: a) if the UE is not monitoring a PDCCH according to search space sets with search space group 1, the UE starts monitoring the PDCCH according to search space set with search space group 1, and the UE stops monitoring PDCCH according to search space set with search space group 0, on a first group of serving cells at a first slot that is at least P symbols after the last symbol of the PDCCH with a DCI format 2_0, if the UE detects the DCI format 2_0 in a slot and a value of a first indication field in the DCI format 2_0 is 1; b) if the UE is not monitoring the PDCCH according to search space sets with search space group 0, the UE starts monitoring the PDCCH according to search space set with search space group 0, and the UE stops monitoring the PDCCH according to search space set with search space group 1, on the first group of serving cells at the first slot that is at least P symbols after the last symbol of the PDCCH with the DCI format 2_0, if the UE detects the DCI format 2_0 in a slot and the value of the first indication field in DCI format 2_0 is 0; or c) if the UE monitors the PDCCH on a first serving cell according to search space sets with group index 1, the UE starts monitoring the PDCCH on a serving cell according to search space sets with group index 0, and stops monitoring the PDCCH according to search space sets with group index 1, on first group serving cells at the beginning of the first slot that is at least P symbols after the last symbol of a reference slot or after a last symbol of a first remaining channel occupancy duration.

In a sixth aspect of the present disclosure, a UE includes a memory, a transceiver, and a processor coupled to the memory and the transceiver. The processor is configured to perform at least one of the followings: a) if the UE is not monitoring a PDCCH according to search space sets with search space group 1, the UE starts monitoring the PDCCH according to search space set with search space group 1, and the UE stops monitoring PDCCH according to search space set with search space group 0, on a first group of serving cells at a first slot that is at least P symbols after the last symbol of the PDCCH with a DCI format 2_0, if the UE detects the DCI format 2_0 in a slot and a value of a first indication field in the DCI format 2_0 is 1; b) if the UE is not monitoring the PDCCH according to search space sets with search space group 0, the UE starts monitoring the PDCCH according to search space set with search space group 0, and the UE stops monitoring the PDCCH according to search space set with search space group 1, on the first group of serving cells at the first slot that is at least P symbols after the last symbol of the PDCCH with the DCI format 2_0, if the UE detects the DCI format 2_0 in a slot and the value of the first indication field in DCI format 2_0 is 0; or c) if the UE monitors the PDCCH on a first serving cell according to search space sets with group index 1, the UE starts monitoring the PDCCH on a serving cell according to search space sets with group index 0, and stops monitoring the PDCCH according to search space sets with group index 1, on first group serving cells at the beginning of the first slot that is at least P symbols after the last symbol of a reference slot or after a last symbol of a first remaining channel occupancy duration.

In a seventh aspect of the present disclosure, a method of communication of a UE includes if the UE detects a first information, the UE starts monitoring a PDCCH according to search space set with a first target search space group.

In an eighth aspect of the present disclosure, a UE includes a memory, a transceiver, and a processor coupled to the memory and the transceiver. The processor is configured to perform the following: if the UE detects a first information, the UE starts monitoring a PDCCH according to search space set with a first target search space group.

In a ninth aspect of the present disclosure, a method of communication of a UE includes at least one of the followings: a) if the UE is not monitoring a PDCCH according to search space sets with search space group 1, and if the UE detects a DCI format by monitoring the PDCCH in any search space set, the UE starts monitoring the PDCCH according to search space set with search space group 1, and the UE stops monitoring the PDCCH according to search space set with search space group 0, on a first serving cell at a first slot that is at least P symbols after the last symbol of the PDCCH with the DCI format; b) if the UE is not monitoring the PDCCH according to search space sets with search space group 1, and if the UE detects the DCI format by monitoring the PDCCH according to search space sets with search space group 0, the UE starts monitoring the PDCCH according to search space set with search space group 1, and the UE stops monitoring the PDCCH according to search space set with the search space group 0, on the first serving cell at the first slot that is at least P symbols after the last symbol of the PDCCH with the DCI format; c) if the UE is not monitoring the PDCCH according to search space sets with search space group 1, and if the UE detects any downlink signal or channel or downlink transmission, the UE starts monitoring the PDCCH according to search space set with search space group 1, and stops monitoring the PDCCH according to search space set with search space group 0, on the first serving cell at the first slot that is at least P symbols after the last symbol of the downlink signal or channel or downlink transmission; or d) if the UE monitors the PDCCH on the first serving cell according to search space sets with group index 1, the UE starts monitoring the PDCCH on a serving cell according to search space sets with group index 0, and stops monitoring the PDCCH according to search space sets with group index 1, on the serving cell at the beginning of the first slot that is at least P symbols after the last symbol of the slot where a timer expires or after the last symbol of the remaining channel occupancy duration for the first serving cell.

In a tenth aspect of the present disclosure, a UE includes a memory, a transceiver, and a processor coupled to the memory and the transceiver. The processor is configured to perform at least one of the followings: a) if the UE is not monitoring a PDCCH according to search space sets with search space group 1, and if the UE detects a DCI format by monitoring the PDCCH in any search space set, the UE starts monitoring the PDCCH according to search space set with search space group 1, and the UE stops monitoring the PDCCH according to search space set with search space group 0, on a first serving cell at a first slot that is at least P symbols after the last symbol of the PDCCH with the DCI format; b) if the UE is not monitoring the PDCCH according to search space sets with search space group 1, and if the UE detects the DCI format by monitoring the PDCCH according to search space sets with search space group 0, the UE starts monitoring the PDCCH according to search space set with search space group 1, and the UE stops monitoring the PDCCH according to search space set with the search space group 0, on the first serving cell at the first slot that is at least P symbols after the last symbol of the PDCCH with the DCI format; c) if the UE is not monitoring the PDCCH according to search space sets with search space group 1, and if the UE detects any downlink signal or channel or downlink transmission, the UE starts monitoring the PDCCH according to search space set with search space group 1, and stops monitoring the PDCCH according to search space set with search space group 0, on the first serving cell at the first slot that is at least P symbols after the last symbol of the downlink signal or channel or downlink transmission; or d) if the UE monitors the PDCCH on the first serving cell according to search space sets with group index 1, the UE starts monitoring the PDCCH on a serving cell according to search space sets with group index 0, and stops monitoring the PDCCH according to search space sets with group index 1, on the serving cell at the beginning of the first slot that is at least P symbols after the last symbol of the slot where a timer expires or after the last symbol of the remaining channel occupancy duration for the first serving cell.

In an eleventh aspect of the present disclosure, a method of communication of a UE includes at least one of the followings: a) if the UE is not monitoring a PDCCH according to search space sets with search space group 1, and if the UE detects a DCI format by monitoring the PDCCH in any search space set, the UE starts monitoring the PDCCH according to search space set with search space group 1, and stops monitoring the PDCCH according to search space set with search space group 0, on a first group of serving cells at a first slot that is at least P symbols after the last symbol of the PDCCH with the DCI format; b) if the UE is not monitoring the PDCCH according to search space sets with search space group 1, and if the UE detects the DCI format by monitoring the PDCCH according to search space set with search space group 0, the UE starts monitoring the PDCCH according to search space set with search space group 1, and the UE stops monitoring the PDCCH according to search space set with search space group 0, on the first group of serving cells at the first slot that is at least P symbols after the last symbol of the PDCCH with the DCI format; c) if the UE is not monitoring the PDCCH according to search space sets with search space group 1, and if the UE detects any downlink signal or channel or downlink transmission, the UE starts monitoring the PDCCH according to search space set with search space group 1, and the UE stops monitoring the PDCCH according to search space set with search space group 0, on the first group of serving cells at the first slot that is at least P symbols after the last symbol of the downlink signal or channel or downlink transmission; or d) if the UE monitors the PDCCH on the first serving cell according to search space sets with group index 1, the UE starts monitoring the PDCCH on a serving cell according to search space sets with group index 0, and the UE stops monitoring the PDCCH according to search space sets with group index 1, on the first group of serving cells, and/or on a first serving cell, at the beginning of the first slot that is at least P symbols after the last symbol of a reference slot or after the last symbol of a first remaining channel occupancy duration.

In a twelfth aspect of the present disclosure, a UE includes a memory, a transceiver, and a processor coupled to the memory and the transceiver. The processor is configured to perform at least one of the followings: a) if the UE is not monitoring a PDCCH according to search space sets with search space group 1, and if the UE detects a DCI format by monitoring the PDCCH in any search space set, the UE starts monitoring the PDCCH according to search space set with search space group 1, and stops monitoring the PDCCH according to search space set with search space group 0, on a first group of serving cells at a first slot that is at least P symbols after the last symbol of the PDCCH with the DCI format; b) if the UE is not monitoring the PDCCH according to search space sets with search space group 1, and if the UE detects the DCI format by monitoring the PDCCH according to search space set with search space group 0, the UE starts monitoring the PDCCH according to search space set with search space group 1, and the UE stops monitoring the PDCCH according to search space set with search space group 0, on the first group of serving cells at the first slot that is at least P symbols after the last symbol of the PDCCH with the DCI format; c) if the UE is not monitoring the PDCCH according to search space sets with search space group 1, and if the UE detects any downlink signal or channel or downlink transmission, the UE starts monitoring the PDCCH according to search space set with search space group 1, and the UE stops monitoring the PDCCH according to search space set with search space group 0, on the first group of serving cells at the first slot that is at least P symbols after the last symbol of the downlink signal or channel or downlink transmission; or d) if the UE monitors the PDCCH on the first serving cell according to search space sets with group index 1, the UE starts monitoring the PDCCH on a serving cell according to search space sets with group index 0, and the UE stops monitoring the PDCCH according to search space sets with group index 1, on the first group of serving cells, and/or on a first serving cell, at the beginning of the first slot that is at least P symbols after the last symbol of a reference slot or after the last symbol of a first remaining channel occupancy duration.

In a thirteenth aspect of the present disclosure, a method of communication of a base station (BS) includes transmitting, by the BS, a first information, wherein the first information corresponds to search space group monitoring for a first serving cell.

In a fourteenth aspect of the present disclosure, a BS includes a memory, a transceiver, and a processor coupled to the memory and the transceiver. The processor is configured to control the transceiver to transmit a first information, wherein the first information corresponds to search space group monitoring for a first serving cell.

In a fifteenth aspect of the present disclosure, a non-transitory machine-readable storage medium has stored thereon instructions that, when executed by a computer, cause the computer to perform the above method.

In a sixteenth aspect of the present disclosure, a chip includes a processor, configured to call and run a computer program stored in a memory, to cause a device in which the chip is installed to execute the above method.

In a seventeenth aspect of the present disclosure, a computer readable storage medium, in which a computer program is stored, causes a computer to execute the above method.

In an eighteenth aspect of the present disclosure, a computer program product includes a computer program, and the computer program causes a computer to execute the above method.

In a nineteenth aspect of the present disclosure, a computer program causes a computer to execute the above method.

BRIEF DESCRIPTION OF THE DRAWINGS

In order to more clearly illustrate the embodiments of the present disclosure or related art, the following FIGURES will be described in the embodiments are briefly introduced. It is obvious that the drawings are merely some embodiments of the present disclosure, a person having ordinary skill in this field can obtain other FIGURES according to these FIGURES without paying the premise.

FIG. 1 is a block diagram of a user equipments (UE) and a base station (BS) (e.g., gNB) of communication in a communication network system according to an embodiment of the present disclosure.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In Release 16, a user equipment (UE) can have different search space groups for physical downlink control channel (PDCCH) monitoring. A base station such as a gNB can indicate the UE which search space group should be monitored. In addition, how to provide a search space group indication to indicate the UE which search space group should be monitored and how to provide a method of search space group switching are still open issues. Some embodiments of the present disclosure can provide technical solutions to resolve the issues, provide a search space group indication, and further provide a method of search space group switching. Further, some embodiments of the present disclosure present a method of a search space group indication and the UE switches from one search space group to another.

FIG. 1 illustrates that, in some embodiments, a user equipment (UE) 10 and a base station (BS) (e.g., gNB) 20 of communication in a communication network system 30 according to an embodiment of the present disclosure are provided. The communication network system 30 includes one or more UEs 10 of a cell and the BS 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some examples, a UE can be configured with one or more downlink bandwidth parts (DL BWP) for a serving cell. For each of the configured DL BWP, the network can configure respective PDCCH configuration, which further configures one or more search space sets. One of the configured DL BWP is activated by the network as the active DL BWP, thus the UE will need to monitor PDCCH according to the one or more search space sets in the active DL BWP, and the UE will not monitor PDCCH according to the one or more search space sets in non-activated DL BWP. Each time there is only one active DL BWP. For each configured search space set in a configured DL BWP, the network can further configure that the search space set belongs to group 0 or group 1 or both group 0 and group 1. Optionally, this configuration is given by a RRC parameter, searchSpaceGroupIdList-r16. If this parameter is not present in the PDCCH configuration IE, the search space set does not belong to any group.

When an active DL BWP has configured one or more search space sets, among which some of the search space sets belong to group 0 and some other search space sets belong to group 1, the group 0 is set to be a default group. Note that the default group can be group 0 or group 1, which group is the default group can be RRC configured or pre-defined in the specifications. The UE should start to monitor PDCCH according to the search space sets in the default group (group 0) after the PDCCH configuration or reconfiguration is completed or RRC configuration or reconfiguration, which includes active DL BWP reconfiguration, is completed. The UE can switch the search space group from group 0 to group 1. One example is that the search space sets in group 0 is denser than those in group 1. Thus, when the UE needs to reduce the power consumption, this can be achieved by changing the PDCCH monitoring from a dense search space group to a sparser search space group. The search space group switching should be controlled by the network by the following method: assuming the UE is monitoring PDCCH according to search space sets in group 0 (hereafter, using the term 'UE is monitoring PDCCH in search space group 0' to represent 'UE is monitoring PDCCH according to search space sets in group 0' for simplicity, similarly, 'UE is monitoring PDCCH in search space group 1' represents 'UE is monitoring PDCCH according to search space sets in group 1'), the UE will start to monitor PDCCH in search space group 1, and stops monitoring PDCCH in search space group 0, when at least of the following conditions is met:

Condition 1: the network indicates the UE to switch by explicit indication in DCI format 2_0. In this condition, the network can indicate the UE to change the PDCCH from search space group 0 to search space group 1 with a dedicated indication field in DCI format 2_0. Moreover, this field can indicate the UE to change the search space group, or not change the search space group.

Condition 2: the UE detects a DCI format when monitoring PDCCH in search space group 0. In this condition, the network does not explicitly indicate the UE to change the search space group, but using a pre-defined rule, i.e. if the UE detects a DCI sent by the network in search space group 0, the UE will change the search space group.

Similarly, when the UE is monitoring PDCCH in search space group 1, the UE will start to monitor PDCCH in search space group 0, and stops monitoring PDCCH in search space group 1, when at least of the following conditions is met:

Condition 3: the network indicates the UE to switch by explicit indication in DCI format 2_0. This condition is similar to condition 1, the network can use the same indication field in DCI format 2_0 to inform the UE to change the search space group or not to change the search space group.

Condition 4: a timer expires and/or a channel occupancy duration of the serving cell ends, where the timer is the search space group timer of the serving cell and the channel occupancy duration of the serving cell can be obtained from the DCI format 2_0 and/or system information for semi-static channel access mode system.

In the above examples, the search space group switching happens in the active DL BWP of a serving cell. In another example, the network may configure more than one serving cell for a UE. Moreover, the network can configure one or more serving cells into a cell group. Furthermore, the network can configure if the search space group switching is performed per serving cell, or per a group of serving cells (i.e. per cell group). The benefit of search space group switching per cell group is that switching behavior is synchronized among a cell group, i.e. the network can avoid the case where in one serving cell, a UE is monitoring in search space group 0 and at the same time in another serving cell, the UE is monitoring in search space group 1. To make this function work, there is one issue that needs to be solved. To perform synchronized search space group switching for a cell group, the active DL BWP of the respective serving cells in the cell group should be configured with both search space group 0 and search space group 1. For example, for a cell group, there are serving cell 1 (cell 1) or serving cell 2 (cell 2). For cell 1, its active DL BWP is configured with search space sets in group 0 and search space sets in group 1. But for cell 2, its active DL BWP is configured only with search space sets in group 0. In this case, the per cell group search space group switching cannot be performed, because when UE switches the search space sets from group 0 to group 1 for cell 2, the UE cannot switch to the search space group 1 for cell 1, as the active DL BWP of cell 1 is not configured with search space set for group 1. For this case, the network may consider the following solutions.

In solution 1, the network only configures the serving cells, which are configured always with search space group 0 and group 1 in their active DL BWP, into a cell group. This is the simplest solution, and the search space group switching behavior can be synchronized in the cell group.

In solution 2, the serving cells, which are not configured with search space sets in group 0 and in group 1 in their active DL BWP, are not activated for search space switching function per cell group, even though these serving cells are configured in the cell group. Following our previous example to explain the solution 2: even if the cell 1 and the cell 2 are configured in the same cell group, once the network informs the UE to perform search space group switching per cell group, the UE will not consider the cell 2 as a member of the cell group for this function. Therefore, once the search space group switching is triggered, only the cell 1 will perform search space group switching, the cell 2 is not considered.

In solution 3, all the serving cells in a cell group will perform the search space group switching, but for those serving cells that are not configured with two search space groups in their active DL BWP, the UE will not monitor the PDCCH according to the search space sets in the target group. Following our previous example, if the cell 1 and the cell 2 are in the same cell group, the cell 1 is configured search space group 0 and group 1 in its active DL BWP, while the cell 2 is configured only with search space group 0 in its active DL BWP. Assuming that the UE is monitoring PDCCH in search space group 0 on the cell 1 and cell 2, when the search space group switching is triggered by the network, i.e. to change from the search space sets in group 0 to the search space sets in group 1, the UE will start to monitor PDCCH in search space group 1 on the cell 1 and the UE stops monitoring PDCCH in search space group 0 on both the cell 1 and the cell 2. On the other hand, when the search space group switching is triggered again, i.e. to change from the search space group 1 back to the search space group 0, then the UE will start to monitor PDCCH in search space group 0 for both the cell 1 and the cell 2, and the UE stops monitoring PDCCH in search space group 1 on the cell 1. This solution will reduce the power consumption for the cell 2. The search space group 0 to the search space group 1 switching is used for cell 2 to enter into a power saving mode, because the UE does not need to perform PDCCH monitoring in search space group 1 for the cell 2. This is a very interesting solution because the cell is still activated by the UE does not need consume power for PDCCH monitoring.

In some examples, on a serving cell, a UE is indicated by the network to change the active DL BWP from BWP 1 to BWP 2. As we presented previously, the PDCCH configuration is configured in each configured DL BWP. Moreover the PDCCH configuration in BWP 1 can be different from PDCCH configuration in BWP 2. One example is that in BWP 1, its PDCCH configuration only configures search space sets in group 0 (search space group 0). But in BWP 2, its PDCCH configuration configures search space sets in both group 0 and group 1. Assuming that the BWP 1 is the active DL BWP, the UE monitors PDCCH in the search space sets in group 0 in BWP 1. When the network informs the UE to change the active DL BWP from BWP 1 to BWP 2, in the new active DL BWP, the UE will start to monitor the search space sets in a default group. If the default group is 0, then the UE will start to monitor search space sets in group 0 in BWP 2.

Optionally, when the active DL BWP is changed, in the new active DL BWP, the UE will monitor PDCCH in the search space sets in the group that has the same group index as the old active DL BWP before active DL BWP switching. In our example, the UE will still monitor PDCCH in the search space sets of group 0 in BWP 2 because in BWP 1 the UE monitored in search space group 0. But if BWP 1 is configured with search space sets in group 1 only, then after active DL BWP changing from BWP 1 to BWP 2, the UE shall monitor PDCCH in the search space sets in group 1. In some examples, when a UE is informed by the network to change the current active DL BWP to a new active DL BWP, where the new active DL BWP is only configured with search space sets in only one group. Then the UE will start to monitor PDCCH in the search space sets in the only group in the new active DL BWP.

In some examples, on a serving cell, a UE is indicated by a network to change the active DL BWP from BWP 1 to BWP 2, where the BWP 1 and the BWP 2 are configured with respective search space sets in group 0 and group 1. The UE will start to monitor PDCCH in the search space sets in a default group (e.g. the default group is group 0). Thus no matter in which search space group the UE was monitoring before the active DL BWP changing, the UE will monitor PDCCH in search space set in the default group after active DL BWP changing.

Optionally, if the BWP 1 is the current active DL BWP, and if the UE is monitoring PDCCH in search space set in group 0 in BWP 1, the UE detects a DCI format 1_1 that triggers active DL BWP switching from BWP 1 to BWP 2, the UE will start to monitor PDCCH in the search space sets in group 1 in BWP 2, if the DCI format 1_1 is detected in any search space sets in group 0 in BWP 1.

Optionally, if the BWP 1 is the current active DL BWP, and if the UE is monitoring PDCCH in search space set in group 1 in BWP 1, the UE detects a DCI format 1_1 that triggers active DL BWP switching from BWP 1 to BWP 2, the UE will start to monitor PDCCH in the search space sets in group 1 in BWP 2, if a timer is not expired or channel occupancy duration of the serving cell, that BWP 1 and BWP 2 belong to, is not ended, where the timer is the search space group timer of the serving cell that BWP 1 and BWP 2 belong to. Otherwise, the UE will switch to monitoring PDCCH in the search space sets in group 0. The channel occupancy duration of the serving cell can be obtained from the DCI format 2_0 and/or system information for semi-static channel access mode system.

In some examples, the network comprises at least one of the following: a base station, a gNB, or an eNB.

In some examples, the search space group switching does not happen in an instantaneous manner, i.e. there is a pre-defined processing delay between the moment when the UE knows the search space group switching is triggered and the moment when the search space group switching is realized. In our presented examples, when we say the UE starts to monitor PDCCH in the search space sets in a new group, and stops monitor PDCCH in the search space sets in an old group, it refers to the moment when processing delay is passed.

In some examples, the network indicates the UE to change the active DL BWP by at least one of the following ways: 1) using DCI format 1_1, the network can transmit a DCI format 1_1, in which there is an indication field to indicate the active DL BWP index, if the indicated DL BWP index is different from the current active DL BWP index, it refers to active DL BWP switching. Note that in these case, the DL BWP switching does not happen in an instantaneous manner, i.e. there is a pre-defined DL BWP switching delay between the moment when the UE knows the DL BWP switching is triggered and the moment when the DL BWP switching is realized. In our presented examples, when we say the UE starts to monitor PDCCH in the search space sets in a new group, and stops monitor PDCCH in the search space sets in an old group, it refers to the moment when DL BWP switching delay is passed. 2) RRC configuration or reconfiguration. 3) DL BWP switching due to the inactivityTimer of the active DL BWP expires.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed. It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of communication of a user equipment (UE), comprising:
   receiving, by the UE, a first information from a network device;
   performing physical downlink control channel (PDCCH) monitoring based on the first information,
   wherein the first information corresponds to search space group monitoring for a first serving cell;
   wherein the UE is configured with a plurality of search space groups for PDCCH monitoring, each space group comprises a plurality of search space sets,
   wherein the plurality of search space groups comprise a first search space group and a second search space group;
   wherein the first information is a search space indication, in a case that the UE is monitoring PDCCH in the first search space group, the first information is used for:
   indicating the UE to switch from the first search space group to the second search space group, or,
   indicating the UE not to change search space group;
   in a case that the UE is monitoring PDCCH in the second search space group, the first information is used for:

indicating the UE to switch from the second search space group to the first search space group, or, indicating the UE not to change search space group;

the performing PDCCH monitoring based on the first information comprises:

performing search space group switching according to the first information;

wherein the first search space group has an index of group 0, and the second search space group has an index of group 1, wherein search space sets in group 0 is denser than search space sets in group 1;

wherein the first information is carried in DCI format 2_0.

2. The method of claim 1, wherein the search space group switching is performed by the UE per serving cell, or wherein the UE is configured by the network device with a cell group, the cell group comprises one or more serving cells, and the search space group switching is performed by the UE per cell group.

3. A method of communication of a base station (BS), comprising:

transmitting, by the BS, a first information to a user equipment (UE);

wherein the first information corresponds to search space group monitoring for a first serving cell;

wherein the first information is a search space indication, in a case that the UE is monitoring PDCCH in a first search space group, the first information is used for:

indicating the UE to switch from the first search space group to a second search space group, or, indicating the UE not to change search space group;

in a case that the UE is monitoring PDCCH in the second search space group, the first information is used for:

indicating the UE to switch from the second search space group to the first search space group, or, indicating the UE not to change search space group;

wherein the first search space group and the second search space group are search space groups configured for the UE for physical downlink control channel (PDCCH) monitoring, and each of the first search space group and the second search space group comprises a plurality of search space sets;

wherein the first search space group has an index of group 0, and the second search space group has an index of group 1, wherein search space sets in group 0 is denser than search space sets in group 1;

wherein the first information is carried in DCI format 2_0.

4. A base station (BS), comprising:

a processor, a memory, and a transceiver;

wherein the transceiver is configured to communicate with a user equipment (UE);

the memory is configured to store instructions; and the processor is configured to execute the instructions stored in the memory to perform the method according to claim 3.

5. A user equipment (UE), comprising:

a processor, a memory, and a transceiver;

wherein the transceiver is configured to communicate with a network device;

the memory is configured to store instructions; and the processor is configured to execute the instructions stored in the memory to:

control the transceiver to receive a first information from a network device;

perform physical downlink control channel (PDCCH) monitoring based on the first information, wherein the first information corresponds to search space group monitoring for a first serving cell;

wherein the UE is configured with a plurality of search space groups for PDCCH monitoring, each space group comprises a plurality of search space sets, wherein the plurality of search space groups comprise a first search space group and a second search space group;

wherein the first information is a search space indication, in a case that the UE is monitoring PDCCH in the first search space group, the first information is used for:

indicating the UE to switch from the first search space group to the second search space group, or, indicating the UE not to change search space group;

in a case that the UE is monitoring PDCCH in the second search space group, the first information is used for:

indicating the UE to switch from the second search space group to the first search space group, or, indicating the UE not to change search space group:

the processor is configured to execute the instructions stored in the memory to:

perform search space group switching according to the first information;

wherein the first search space group has an index of group 0, and the second search space group has an index of group 1, wherein search space sets in group 0 is denser than search space sets in group 1;

wherein the first information is carried in DCI format 2_0.

6. The UE of claim 5, wherein the search space group switching is performed by the UE per serving cell, or wherein the UE is configured by the network device with a cell group, the cell group comprises one or more serving cells, and the search space group switching is performed by the UE per cell group.

* * * * *